US010186943B2

(12) United States Patent
Jones

(10) Patent No.: US 10,186,943 B2
(45) Date of Patent: Jan. 22, 2019

(54) ELECTRICAL ASSEMBLY COMPRISING A CHAIN-LINK CONVERTER

(71) Applicant: General Electric Technology GmbH, Baden (CH)

(72) Inventor: Phil Jones, Stafford (GB)

(73) Assignee: GENERAL ELECTRIC TECHNOLOGY GMBH, Baden (CH)

( * ) Notice: Subject to any disclaimer, the term of this patent is extended or adjusted under 35 U.S.C. 154(b) by 309 days.

(21) Appl. No.: 15/025,704

(22) PCT Filed: Aug. 27, 2014

(86) PCT No.: PCT/EP2014/068199
§ 371 (c)(1),
(2) Date: Mar. 29, 2016

(87) PCT Pub. No.: WO2015/043862
PCT Pub. Date: Apr. 2, 2015

(65) Prior Publication Data
US 2016/0248314 A1 Aug. 25, 2016

(30) Foreign Application Priority Data

Sep. 30, 2013 (GB) .................................. 1317297.8

(51) Int. Cl.
*G06K 9/00* (2006.01)
*H02M 1/08* (2006.01)
(Continued)

(52) U.S. Cl.
CPC ............... *H02M 1/08* (2013.01); *G06F 11/30* (2013.01); *H02J 1/10* (2013.01); *H04B 10/27* (2013.01);
(Continued)

(58) Field of Classification Search
CPC ................... H02M 1/08; H02M 1/088; H02M 2001/0003; H02M 1/32; H02M 7/483; H04B 10/27; G01R 31/02; G06F 11/30
See application file for complete search history.

(56) References Cited

U.S. PATENT DOCUMENTS 4,866,629 A 9/1989 Chen et al.
9,882,463 B2 * 1/2018 Stott ..................... H02M 1/088
(Continued)

FOREIGN PATENT DOCUMENTS

CN 103235219 A 8/2013
EP 2 549 634 A1 1/2013
(Continued)

OTHER PUBLICATIONS

International Search Report and Written Opinion, PCT/EP2014/068199, Alstom Technology Ltd., 12 pages (Feb. 9, 2015).
(Continued)

*Primary Examiner* — Amir Alavi
(74) *Attorney, Agent, or Firm* — GE Global Patent Operation; Scott R. Stanley

(57) ABSTRACT

An electrical assembly comprises a chain-link converter which includes a plurality of chain-link sub-modules. Each of the chain-link sub-modules is operable to provide a voltage source. Moreover, each of the chain-link sub-modules is provided with a visual indicator. The electrical assembly includes a controller which is configured to selectively operate each of the visual indicators to present a respective mapping visual signal. The electrical assembly additionally includes an image receiving device which is configured to receive the respective mapping visual signal. The electrical assembly also includes a processor which is operatively coupled to the image receiving device. The processor is configured to receive and process the respective mapping visual signal received by the image receiving
(Continued)

device so as to create a map of a spatial arrangement of the chain-link sub-modules.

17 Claims, 5 Drawing Sheets

(51) Int. Cl.
    *G06F 11/30*     (2006.01)
    *H02J 1/10*     (2006.01)
    *H04B 10/27*     (2013.01)
    *H02M 7/483*     (2007.01)

(52) U.S. Cl.
    CPC .... *H02M 7/483* (2013.01); *H02M 2007/4835* (2013.01)

(56) References Cited

U.S. PATENT DOCUMENTS

| | | |
|---|---|---|
| 2001/0056336 A1 | 12/2001 | Suzuki et al. |
| 2004/0181367 A1 | 9/2004 | Nguyen et al. |
| 2006/0015205 A1 | 1/2006 | Murray |
| 2008/0123967 A1 | 5/2008 | Berini et al. |
| 2009/0088149 A1 | 4/2009 | Niimi et al. |
| 2011/0140727 A1 | 6/2011 | Soldi et al. |
| 2013/0094264 A1* | 4/2013 | Crookes ................ H02J 3/1835 363/127 |
| 2013/0128635 A1 | 5/2013 | Korn |
| 2015/0357931 A1* | 12/2015 | Oates .................... H02M 7/493 363/89 |
| 2016/0241125 A1* | 8/2016 | Couch ................... H02M 7/483 |
| 2016/0248314 A1* | 8/2016 | Jones ..................... G06F 11/30 |
| 2017/0077797 A1* | 3/2017 | Stott ....................... H02M 1/32 |
| 2018/0013290 A1* | 1/2018 | Outram .................. H02J 3/36 |

FOREIGN PATENT DOCUMENTS

| | | |
|---|---|---|
| EP | 2 854 282 A1 | 4/2015 |
| EP | 2 884 825 A1 | 6/2015 |
| JP | 2012-238116 A | 12/2012 |
| WO | WO-2012/033958 A1 | 3/2012 |
| WO | WO-2015/044432 A1 | 4/2015 |

OTHER PUBLICATIONS

English-language machine translation of CN 103235219, University of North China Elec Power (Aug. 7, 2013).

* cited by examiner

ELECTRICAL ASSEMBLY COMPRISING A CHAIN-LINK CONVERTER

CROSS-REFERENCE TO RELATED APPLICATIONS

The present application is a National Stage of International Application No. PCT/EP2014/068199, filed Aug. 27, 2014, which claims the benefit of and priority to United Kingdom Application No. 1317297, filed Sep. 30, 2013, which is incorporated herein by reference in its entirety.

This invention relates to an electrical assembly which includes a chain-link converter and a method of identifying the location of a chain-link sub-module within a chain-link converter.

One or more chain-link converters are often utilised in Voltage Source Converters (VSC), such as those used to transmit direct current (DC) power, or in static synchronous compensators (STATCOM).

A typical voltage source converter is shown schematically in FIG. 1. The voltage source converter 10 includes first and second DC terminals 12, 14 between which extends a converter limb 16. Other voltage source converters may include more than one converter limb 16 and, in particular, may include three converter limbs each of which corresponds to a given phase of a three-phase electrical power system.

The converter limb 16 includes first and second limb portions 18, 20 which are separated by an alternating current (AC) terminal 22.

In use the first and second DC terminals 12, 14 are respectively connected to positive and negative terminals of a DC network, and the AC terminal 22 is connected to an AC network.

Each limb portion 18, 20 includes a chain-link converter 24 which extends between the AC terminal 22 and a corresponding one of the first or the second DC terminals 12, 14. Each chain-link converter 24 includes a plurality of series connected chain-link modules 26, and each chain-link module 26 in turn includes a plurality of, e.g. eight, series connected chain-link sub-modules 28.

Each chain-link sub-module 28 includes a number of switching elements 30 which are connected in parallel with an energy storage device in the form of a capacitor 32. In the arrangements shown each switching element 30 includes a semiconductor device 34 in the form of, e.g. an Insulated Gate Bipolar Transistor (IGBT), which is connected in parallel with an anti-parallel diode 36. It is, however, possible to use other semiconductor devices.

FIG. 2(a) shows an example first chain-link sub-module 28 in which first and second pairs 38, 40 of switching elements 30 and a capacitor 32 are connected in a known full bridge arrangement to define a 4-quadrant bipolar module. Switching of the switching elements 30 selectively directs current through the capacitor 32 or causes current to bypass the capacitor 32 such that the first chain-link sub-module 28 can provide zero, positive or negative voltage and can conduct current in two directions.

FIG. 2(b) shows an example second chain-link sub-module 28 in which only a first pair 38 of switching elements 30 is connected in parallel with a capacitor 32 in a known half-bridge arrangement to define a 2-quadrant unipolar module. In a similar manner to the first chain-link sub-module 28, switching of the switching elements 30 again selectively directs current through the capacitor 32 or causes current to bypass the capacitor 32 such that the second chain-link sub-module 28 can provide zero or positive voltage and can conduct current in two directions.

In this manner it is possible to build up a combined voltage across each chain-link module 26, via the insertion of the capacitors 32 of multiple chain-link sub-modules 28 (with each sub-module 28 providing its own voltage), which is higher than the voltage available from each individual chain-link sub-module 28.

Moreover, it is similarly possible to build up a combined voltage across each chain-link converter 24 by combining the individual voltage available from each chain-link module 26.

Accordingly, each of the chain-link modules 26 and its associated chain-link sub-modules 28 work together to permit the chain-link converter 24 to provide a stepped variable voltage source. This permits the generation of a voltage waveform across each chain-link converter 24 using a step-wise approximation. Operation of each chain-link converter 24 in this manner can be used to generate an AC voltage waveform at the AC terminal 22, and thereby enable the voltage source converter 10 to provide the aforementioned power transfer functionality between the AC and DC networks.

According to a first aspect of the invention there is provided an electrical assembly comprising:
  a chain-link converter including a plurality of chain-link sub-modules each of which is operable to provide a voltage source, each of the chain-link sub-modules being provided with a visual indicator;
  a controller configured to selectively operate each of the visual indicators to present a respective mapping visual signal;
  an image receiving device configured to receive the respective mapping visual signal; and
  a processor operatively coupled to the image receiving device, the processor being configured to receive and process the respective mapping visual signal received by the image receiving device so as to create a map of a spatial arrangement of the chain-link sub-modules.

In order for the waveform generated across each chain-link converter to approximate an AC waveform to a desired extent, it is often necessary for each chain-link converter to include many hundred chain-link modules and, in turn, typically several thousand chain-link sub-modules. Each chain-link sub-module is often individually identifiable by way of a unique serial number which is created during manufacture of the chain-link sub-module and typically is displayed on a serial number label affixed to an exterior of the chain-link sub-module.

It is often necessary for a maintenance operator to be able to identify the physical location of one or more chain-link sub-modules within the chain-link converter when, for example, a chain-link sub-module has failed.

It is not practical to pre-allocate a physical location of a specific chain-link sub-module within such a chain-link converter, e.g. during manufacture of the sub-module, because vagaries in a manufacturer-to-site shipping process mean that a particular chain-link sub-module may be delayed or damaged which might otherwise hold up on-going installation of the chain-link converter.

Configuration of the electrical assembly according to the invention permits creation of a map of a spatial arrangement of the chain-link sub-modules that readily provides a position reference of the chain-link sub-modules' physical locations within the chain-link converter.

In this regard, each visual indicator may be controlled individually, in sequence or simultaneously to present a respective mapping visual signal.

In contrast, a maintenance operator could identify a physical location of a specific chain-link sub-module by referencing the serial number of each chain-link sub-module against the physical location of each chain-link sub-module within the chain-link converter. More particularly, a position reference of the chain-link sub-modules' physical locations within the chain-link converter could be created during installation of the chain-link converter by a maintenance operator manually recording each serial number of each chain-link sub-module against its physical location within the chain-link converter.

Having a maintenance operator manually create a position reference of the chain-link sub-modules' physical locations in this way requires a human operator to generate and keep up to date the necessary physical location information. As such, this process is prone to human error and is extremely time consuming.

On the other hand, the map created by the electrical assembly according to the invention minimises the risk of human error occurring and reduces the time spent on creating a position reference of the chain-link sub-modules' physical location within the chain-link converter.

The map can then be used to locate a physical location of a chain-link sub-module in event that a chain-link sub-module needs to be repaired, for example.

Preferably the controller is configured to selectively operate one or more of the visual indicators to present a or a respective locating visual signal, the image receiving device is configured to receive the or the respective locating visual signal, and wherein the processor is configured to receive and process the or the respective locating visual signal received by the image receiving device to indicate a spatial position of the or each corresponding chain-link sub-modules on the map.

From time to time the switching elements and/or capacitor in a chain-link sub-module may fail such that it becomes necessary to repair or replace a given chain-link sub-module. Under such circumstances it then becomes necessary to physically locate the chain-link sub-module within the associated chain-link converter. Since the operation of the chain-link sub-modules is not specific to a location within the chain-link converter there is no information necessary to give physical locations within an associated control system.

Using a locating visual signal to indicate a spatial position of a particular chain-link sub-module, e.g. a faulty chain-link sub-module, on the map provides easy identification of the physical location of the chain-link sub-module within the chain-link converter.

In contrast, omitting the visual indicator, controller, image receiving device and processor from the electrical assembly according to the invention means that a maintenance operator must visually inspect each serial number label of the chain-link sub-modules to identify a faulty chain-link sub-module.

In addition, the very large number of such chain-link sub-modules typically used in a voltage source converter means that having a maintenance operator visually inspect each serial number label is very time-consuming. This is especially so since the chain-link sub-modules are normally inaccessible from ground level so as to ensure their respective isolation from ground.

Locating the faulty chain-link sub-module using the electrical assembly according to the invention is less time consuming than having a maintenance operator visually inspect each of the chain-link sub-modules to identify the relevant serial number, especially since the serial numbers may be arranged in a random order.

Each visual indicator may be configured to not present a visual signal when the corresponding chain-link sub-module is in a faulty operating state.

Configuring each visual indicator in this way means that the resulting map makes it easier to identify a faulty chain-link sub-module.

For example, each visual indicator may be powered locally by the corresponding chain-link sub-module. In the event that a chain-link sub-module is in a faulty operating state, the corresponding visual indicator no longer has a power source and therefore cannot be operated. As such, the controller is no longer capable of operating the visual indicator and so the visual indicator cannot present a visual signal.

Each visual indicator may instead be powered independently of the corresponding chain-link sub-module. Therefore each visual indicator may be configured to be capable of detecting that the corresponding chain-link sub-module is faulty and thereby not present a visual signal upon detection that the corresponding chain-link sub-module is faulty.

The processor may create one or more identifiers on the map to identify a spatial position of one or more chain-link sub-modules with a visual indicator that is not presenting a visual signal.

For example, if control of a single visual indicator results in the visual indicator not presenting a visual signal, the resulting map would be blank. The blank map indicates to an operator that the corresponding chain-link sub-module is faulty.

The spatial position of the faulty chain-link sub-module can be identified by subsequently controlling each other visual indicator, either simultaneously or sequentially, to present a visual signal. This enables creation of a map with at least one indicator, indicating the spatial position of each corresponding chain-link sub-module with a visual indicator that presents a visual signal, and an identifier (such as a blank space) to identify the relative spatial position of the faulty chain-link sub-module with a visual indicator that did not present a visual signal.

In this way, an operator can quickly and easily identify the physical location of a faulty chain-link sub-module so as to carry out required maintenance.

Alternatively, the controller may be controlled to operate a group of visual indicators. Of the group of visual indicators, some may present a visual signal and some may not. As such, the resulting map will include one or more indicators to indicate a spatial position of the or the respective chain-link sub-module with a visual indicator that presents a visual signal, and one or more identifiers to identify a spatial position of the or the respective chain-link sub-module with a visual indicator that does not present a visual signal.

Therefore if one or more identifiers appear on the map, a maintenance operator can easily identify a failed or faulty chain-link sub-module and look to repair it.

The electrical assembly can therefore be operated in this way to check the overall operational status of the chain-link converter.

The or each visual signal received by the image receiving device may have perspective distortion and so the processor may be further configured to correct the or each perspective distortion.

Due to the size of the chain-link converter, the image receiving device may have to be located at an angle to (instead of directly facing) the chain-link converter to render the image receiving device capable of receiving each visual indicator. As such, the image receiving device's field of view will result in the visual signal (either the mapping or the locating visual signal) being received with a perspective distortion.

The processor being configured to correct the perspective distortion results in a map and/or a spatial position of one or more chain-link sub-modules on the map that corresponds more closely with the physical location of the or each chain-link sub-modules within the chain-link converter.

Optionally the processor is configured to combine data created through processing of each mapping visual signal so as to create the map.

The processor may combine the data created through processing of each mapping signal by overlaying the data to create the map.

In the context of this application, the term "overlaying" is understood to refer to the combining of multiple pieces of data, in this case images received by the image receiving device, to produce a single composite image. In particular, each of the images contains a single mapping visual signal, for example a single source of light presented by a visual indicator, which corresponds to a single chain-link sub-module. Overlaying, i.e. combining, all the images with one another results in a single composite image containing all of the mapping visual signals and therefore represents all of the chain-link sub-module locations relative to one another.

As such, the overlaid data creates a map showing the spatial arrangement of the chain-link sub-modules.

The map may be or may include a grid, a list or a 3-D model.

It is understood that a grid is a framework of spaced bars that are parallel to or cross each other to form a series of squares or rectangles.

Therefore the map being a grid permits a maintenance operator to easily and quickly correlate the spatial position of a chain-link sub-module on the map with the physical location of a chain-link sub-module within the chain-link converter.

The map may be a virtual map.

The term "virtual" in the context of this application means modelling through the use of a computer, where the computer models a physical equivalent.

Therefore the virtual map is a map that corresponds to the physical locations of each chain-link sub-module, and which is created and presented on a computer.

Optionally the processor is operatively coupled to the controller and the controller is configured to selectively operate each visual indicator to present a visual signal.

Such an arrangement permits the operation of each visual indicator and the creation of the virtual map to be carried out at the same location. Moreover, it is likely that the processor will additionally display the map and/or the spatial position of one or more chain-link sub-modules on the map, and so a maintenance operator can control operation of each visual indicator and view the resulting map from one location.

Having a processor that is capable of performing these functions also reduces the number of additional devices required in the electrical assembly.

The components of the visual indicator, the image receiving device and the processor may vary. For example, the visual indicator may be or include an LED, a filament lamp or a mechanical indicator, such as an operable flag or an operable coloured panel. The image receiving device may be or include a camera, preferably a camera that is configured to exclude or include at least one wavelength of light that falls between far infrared and ultra violet regions of the electromagnetic spectrum. Meanwhile the processor may be or include a computer, a mobile phone, a tablet or a microprocessor based device.

Use of such components provides a reliable means of operating the electrical assembly.

According to a second aspect of the invention there is provided a method of identifying the location of a chain-link sub-module within a chain-link converter, the method comprising the steps of:
(a) providing each of the chain-link sub-modules with a visual indicator;
(b) operating each of the visual indicators to present a respective mapping visual signal;
(c) receiving the respective mapping visual signal; and
(d) processing the respective received mapping visual signal to create a map that shows a spatial arrangement of the chain-link sub-modules.

Preferably the method further comprises the steps of:
(e) operating one or more of the visual indicators to present a or a respective locating visual signal;
(f) receiving the respective locating visual signal; and
(f) processing the or the respective locating visual signal to indicate a spatial position of the or each corresponding chain-link sub-modules on the map.

Optionally, the method further comprises the step of configuring each visual indicator to not present a visual signal when the corresponding chain-link sub-module is in a faulty operating state.

The method may further comprise the step of creating one or more identifiers on the map to identify a spatial position of one or more chain-link sub-modules with a visual indicator that is not presenting a visual signal.

Optionally the or each visual signal recorded by the image receiving device has perspective distortion, and wherein the method further comprises the step of correcting the perspective distortion of the or each visual signal.

The method of the invention shares the advantages of the corresponding features of the electrical assembly of the invention.

There now follows a brief description of a preferred embodiment of the invention, by way of a non-limiting example, with reference being made to the following figures in which:

FIG. 4b shows a schematic view of a grid created from the initial virtual map shown in FIG. 4a;

Figure 1:
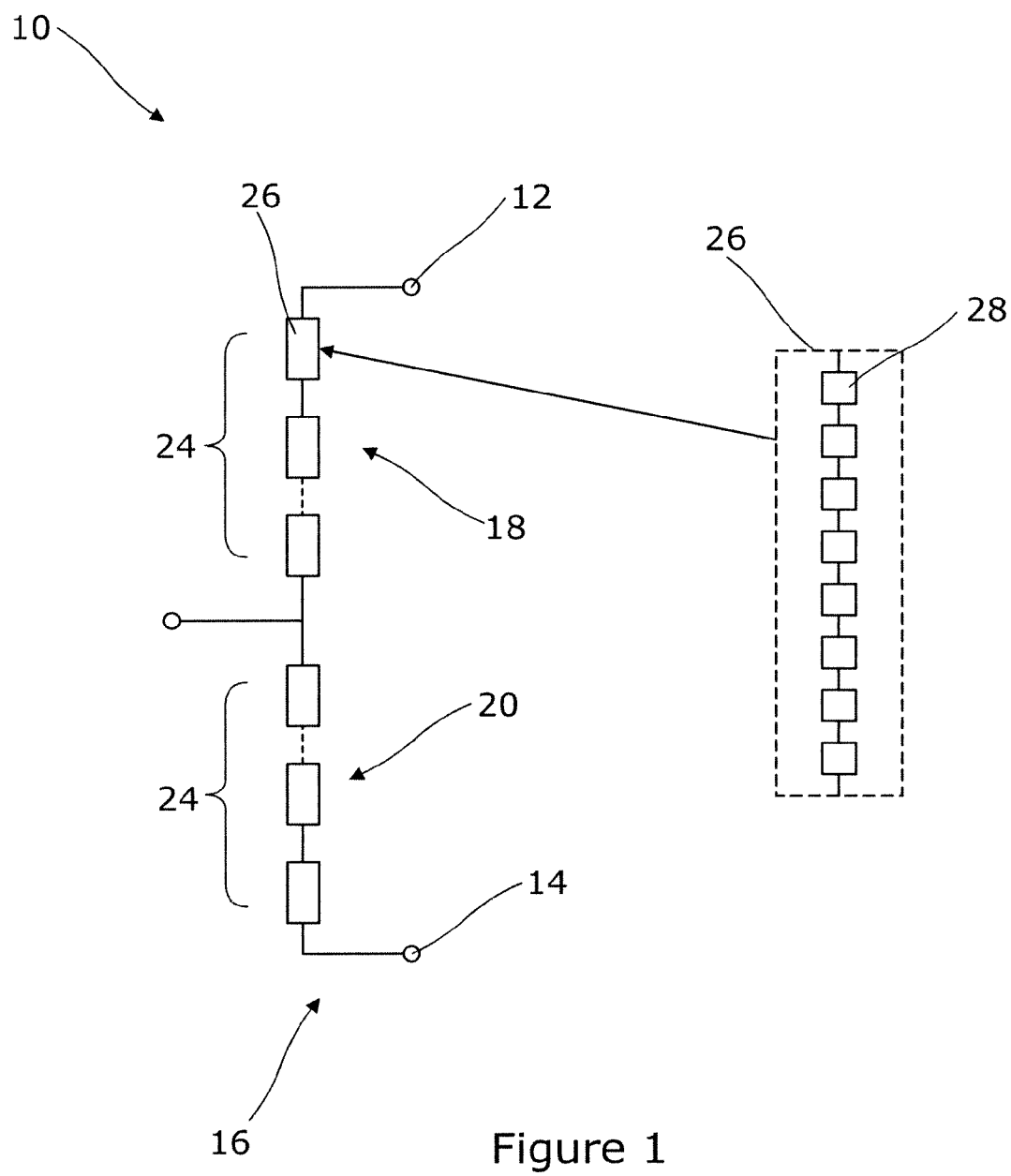
FIG. 1 shows a schematic view of a conventional voltage source converter including first and second chain-link converters.
Figure 2A:
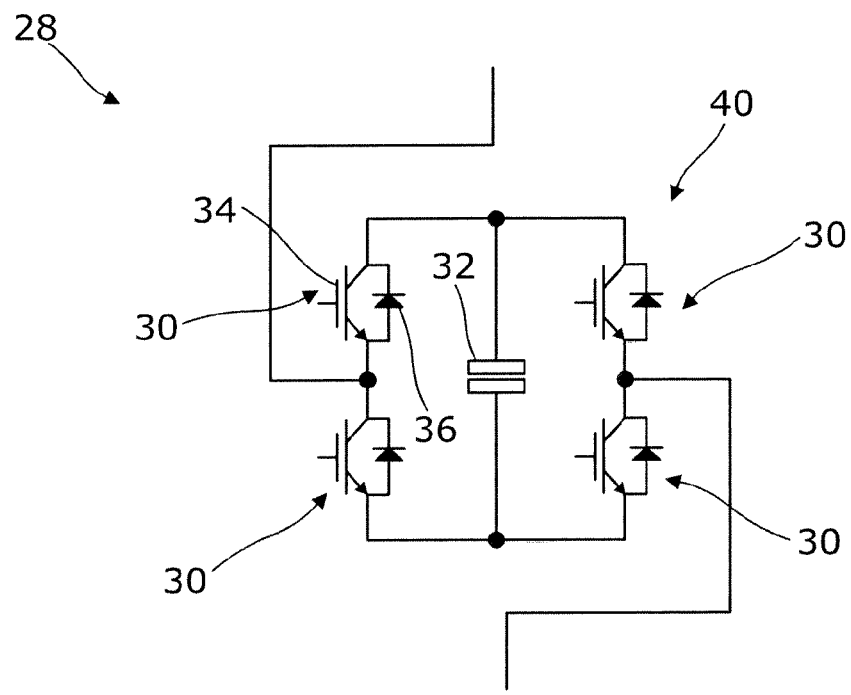
FIG. 2a shows a 4-quadrant bipolar sub-module which can form a part of each of the chain-link converters shown in FIG. 1.
Figure 2B:
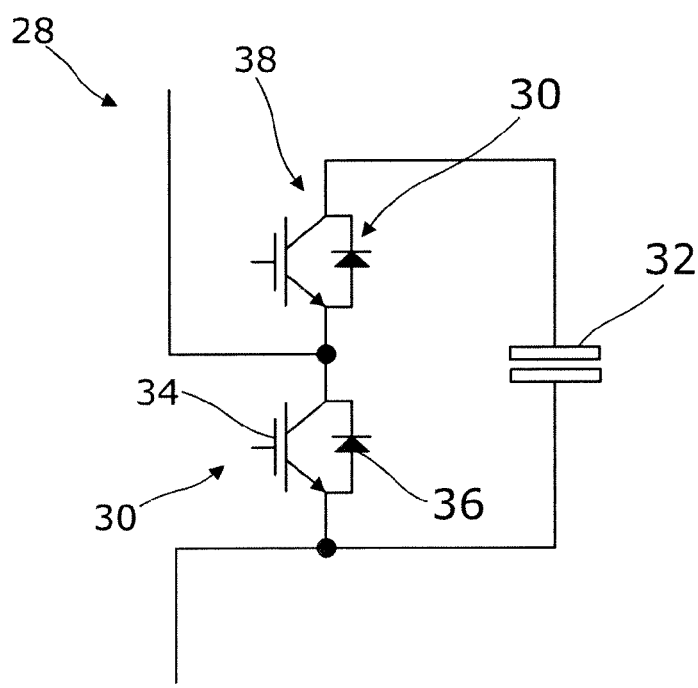
FIG. 2b shows a 2-quadrant unipolar sub-module which can form a part of each of the chain-link converters shown in FIG. 1.
Figure 3:
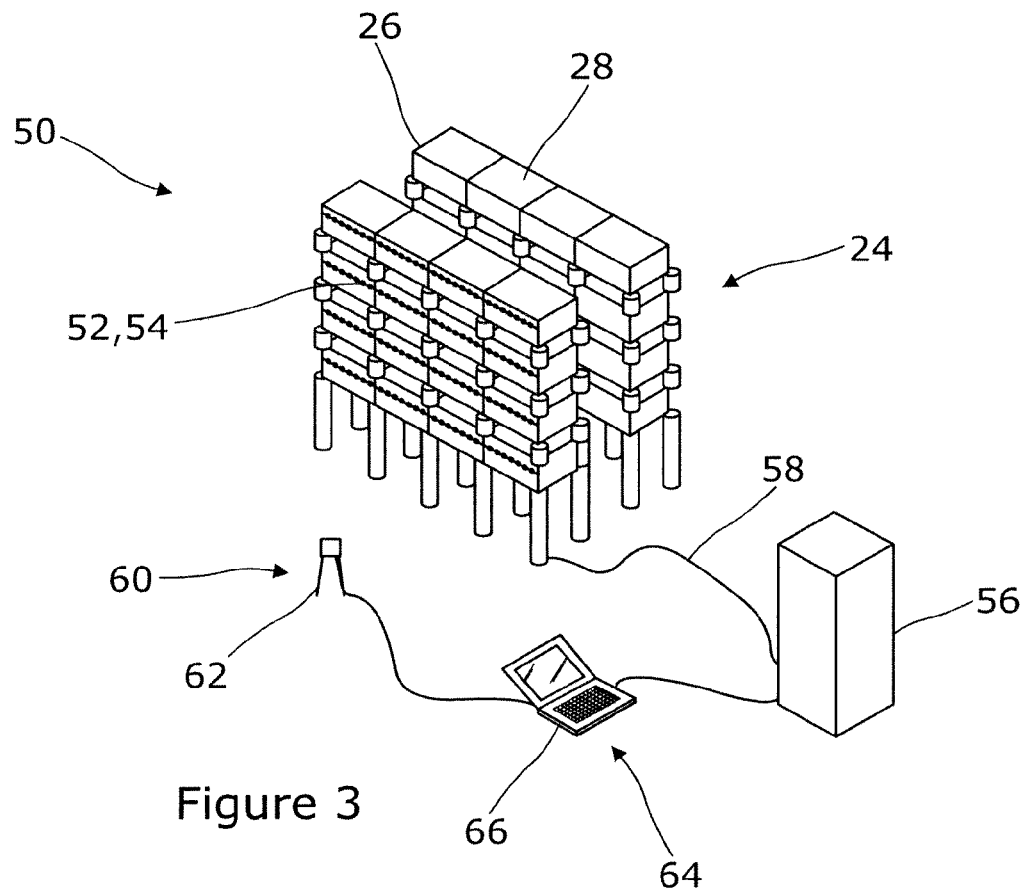
FIG. 3 shows a schematic view of the electrical assembly according to an embodiment of the invention.

An electrical assembly according to a first embodiment of the invention is designated generally by reference numeral 50, and is shown in FIG. 3.

The electrical assembly 50 has a chain-link converter 24 which includes a plurality of chain-link sub-modules 28. Each of the chain-link sub-modules 28 can be operated to provide a voltage source. Each of the chain-link sub-modules 28 is provided with a visual indicator 52.

In the embodiment shown the visual indicators 52 are LEDs 54, each of which are affixed to an exterior of each chain-link sub-module 28.

In other embodiments of the invention each visual indicator may be a filament lamp or a mechanical indicator such as an operable flag or operable coloured panel.

The electrical assembly 50 also includes a controller 56 which is configured to selectively operate each of the LEDs 54 to present a mapping visual signal.

In the embodiment shown, each of the chain-link sub-modules 28 are interconnected to the controller 56 by a passive optical network 58. In other embodiments of the invention each chain-link sub-module may be interconnected to the controller by another type of communications network, such as a point-to-point optical fibre communications network.

Moreover, the controller 56 is also configured to operate each of the chain-link sub-modules 28 to provide a voltage source. In further embodiments of the invention a different controller, instead of the controller 56, may be configured to operate each of the chain-link sub-modules to provide a voltage source.

The electrical assembly 50 further includes an image receiving device 60 which is configured to receive the mapping visual signal presented by each of the LEDs 54. In the embodiment shown, the image receiving device 60 records the mapping visual signal. The use of the term "record" in the context of this application means that the data is either permanently or semi-permanently recorded.

In the embodiment shown the image receiving device 60 is a camera 62. The camera may include sensitivity or filtering that is configured to exclude or include particular wavelengths of light that fall between far infrared and ultra violet regions of the electromagnetic spectrum.

Moreover, the electrical assembly 50 includes a processor 64 which is operatively coupled to the camera 62. In the embodiment shown the processor 64 is connected to the camera 62 via a serial-to-USB cable.

In addition, the processor 64 is operatively coupled to the controller 56. In other embodiments of the invention the processor may be completely separate from the controller.

In the embodiment shown the processor 64 is a computer 66 which includes pre-installed software. However the processor may instead be a microprocessor based device, or a mobile phone with pre-installed software or a tablet with pre-installed software.

The computer 66 is further configured to receive each mapping visual signal and create associated data corresponding to each mapping visual signal.

In other embodiments of the invention the camera may be configured to create the associated data and transfer the data to the computer.

The computer 66 processes the data by overlaying it so as to create a virtual map 67 of the spatial arrangement of the chain-link sub-modules 28.

The computer 66 uses the pre-installed software to carry out such processing. In the embodiment shown, the pre-installed software is a non-standard software that is specifically designed to carry out the relevant task.

The computer 66 is also configured to display the virtual map 67 via the software. In other embodiments of the invention the computer uses a different software to display the virtual map.

In further embodiments of the invention the computer may create a non-virtual map. For example, the computer may be configured to receive and process each mapping visual signal and thereafter create a hard copy of the map via, e.g. a printer.

The controller 56 is further configured to operate one or more of the LEDs 54 to present a locating visual signal. The camera 62 is configured to receive the or each locating visual signal. In this embodiment the camera 62 records the or each locating visual signal. Moreover the computer 66 is configured to receive and process the or each locating visual signal to create indicators 68 which indicates a spatial position of one or more chain-link sub-modules 28 on the virtual map 67.

Figure 5:
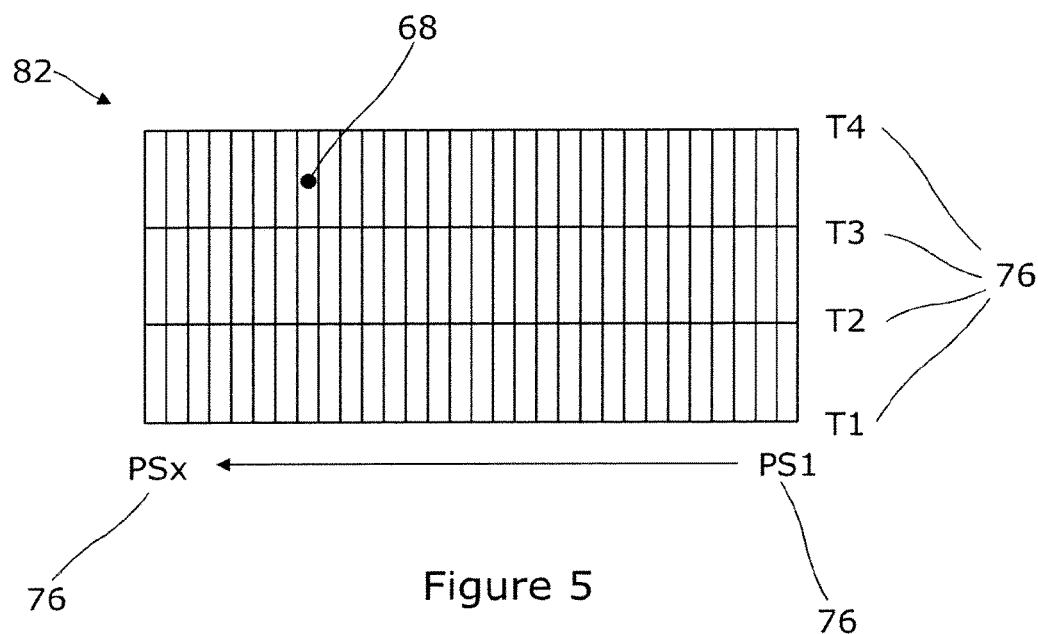
FIG. 5 shows a schematic view of the corrected grid shown in FIG. 4c with an indication of a spatial position of a chain-link sub-module.

The or each indicators 68 may be a point, as shown at FIG. 5. The or each indicator may instead be a cross, a colour, a line or text, for example.

Each LED 54 is further configured to not present a visual signal when the corresponding chain-link sub-module 28 is in a faulty operating state.

In the embodiment shown, each LED 54 is powered locally by the corresponding chain-link sub-module 28. In the event that a chain-link sub-module 28 is in a faulty operating state, the corresponding LED 54 no longer has a power source and therefore cannot be operated. As such, the controller 56 is no longer capable of operating the LED 54 and so the LED 54 does not present a visual signal.

In other embodiments of the invention each LED may instead be powered independently from the chain-link sub-modules. In this embodiment, each LED may be combined with software and/or hardware which is programmed to detect when the corresponding chain-link sub-module 28 is faulty and thereby instruct the LED to not present a visual signal.

Alternatively, in the embodiment where each LED is powered independently from the chain-link sub-modules, a separate global detection system, which is in communication with each of the LEDs and corresponding chain-link sub-modules, may be configured to detect when a chain-link sub-module is faulty and instruct the corresponding LED to not present a visual signal.

The computer 66 is further configured to, via the pre-installed software, create an identifier 70 to identify a spatial position of a chain-link sub-module 28 with a visual indicator 52 that is not presenting a visual signal on the virtual map 67.

Figure 6:
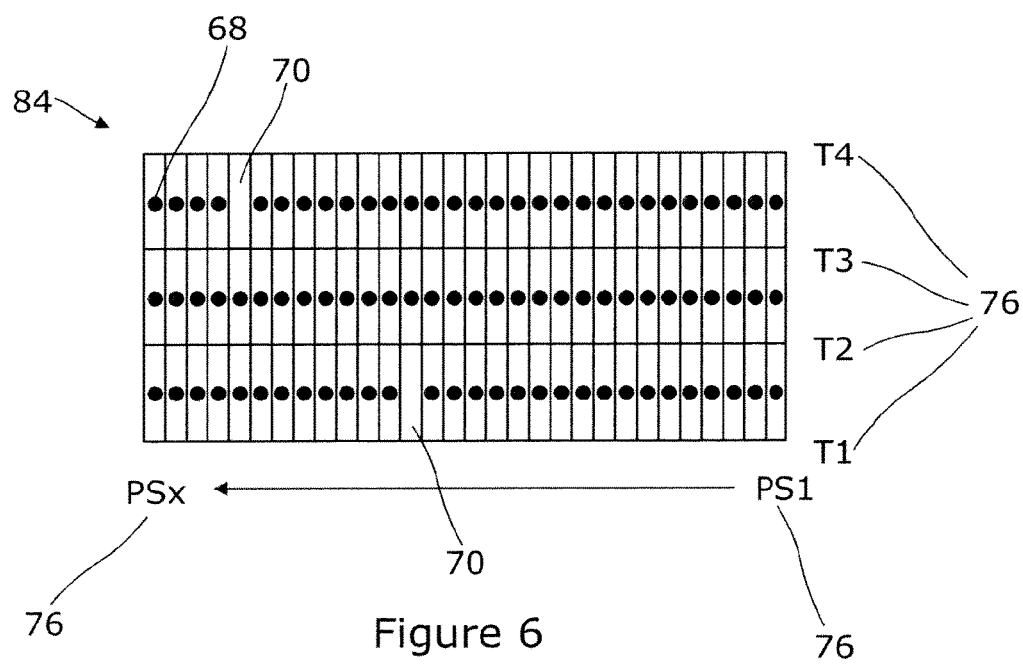
FIG. 6 shows a schematic view of the corrected grid shown in FIG. 4c with an identifier of a spatial position of a failed chain-link sub-module.

The identifier 70 may be a blank space, as shown at FIG. 6.

In other embodiments the identifier may instead be a cross, a colour, a line or text. Moreover, where the identifier is presented on the virtual map together with an indicator, the identifier is capable of distinguishing itself over the indicator.

In the embodiment shown at FIG. 3, the camera 62 is located directly in front of the chain-link converter 24. The chain-link sub-modules 28 are raised off the ground, and so the camera 62 must tilt upwards towards the top of the chain-link converter 24 so that the camera 62 is capable of recording each LED 54.

Therefore, the camera's 62 field of view results in the or each visual signal (either the mapping or the locating visual signal) being recorded with a perspective distortion. In the embodiment shown in FIG. 3 the perspective distortion will be a vertical distortion.

In other embodiments of the invention the camera may be located towards one end of the chain-link converter. Therefore the camera's field of view results in a horizontal perspective distortion.

The computer 66 is configured to correct the perspective distortion of the or each visual signal. The computer 66 corrects the perspective distortion through use of a pre-installed software. This software may be the same as the software used to create the virtual map 67.

Figure 4A:
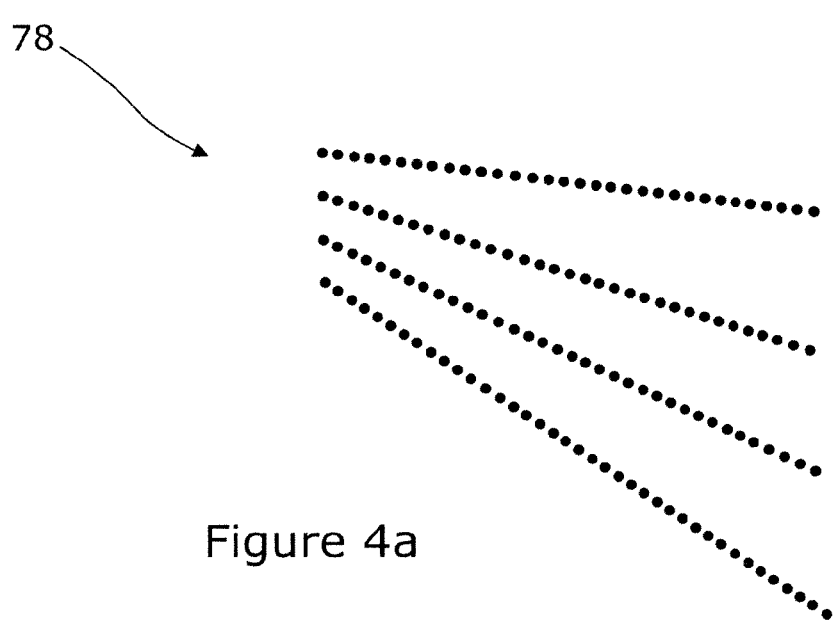
FIG. 4a shows a schematic view of an initial virtual map created by processing each mapping visual signal.
Figure 4B:
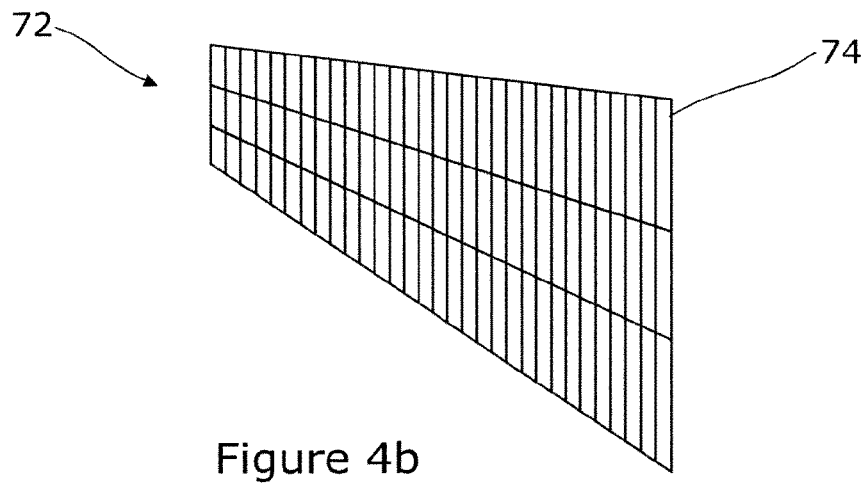
Figure 4C:
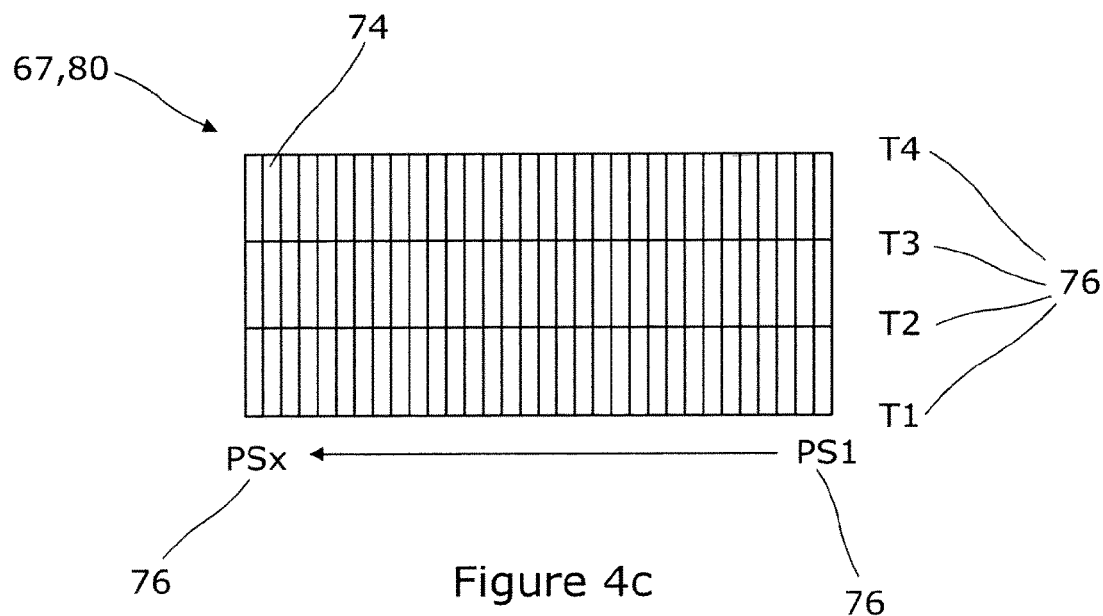
FIG. 4c shows a schematic view of the grid shown in FIG. 4b after correction of perspective distortion.

As shown in FIGS. 4b and 4c the virtual map 67 is a grid 72. FIG. 4c shows the grid 72 after the computer 66 has corrected the perspective distortion. The grid 72 includes a framework of horizontal and vertical lines to form a series of rectangles 74.

The grid 72 is also supplemented with horizontal and vertical grid references 76 each of which corresponds to the number of rows and columns in the grid 72. The number of rows and columns in turn corresponds to the physical number of rows and columns of the chain-link converter 24.

The grid 72 may instead include other means of referencing the series of rectangles 74, such as through use of colour coding.

In other embodiments of the invention where the computer does not correct the perspective distortion, the resulting grid may instead have the appearance of the grid shown in FIG. 4b.

Moreover, in embodiments of the invention where the map is not a grid, the resulting virtual map may instead have the appearance of the map shown in FIG. 4a.

In use, the virtual map 67 is created by firstly inputting a command to the computer 66 to sequentially switch on each of the LEDs 54 via the controller 56 to create a mapping visual signal.

This is done by commanding the controller 56 to switch on each of the LEDs 54 corresponding to a batch of serial numbers of chain-link sub-modules 28 with a time gap in between. The batch of serial numbers will be known from the installation of the chain-link converter 24.

In other embodiments of the invention the controller switches on each LED simultaneously or individually.

Each mapping visual signal is recorded by the camera 62 which transfers each mapping visual signal to the computer 66.

The pre-installed software on the computer 66 creates data associated with each of the mapping visual signals and then overlays that data to create an initial virtual map 78, as shown in FIG. 4a.

The software on the computer 66 then creates a grid 72 from the initial virtual map 78, as shown in FIG. 4b.

Next, the software corrects the perspective distortion of the grid 72 to create a corrected grid 80, as shown in FIG. 4c. The software finally adds horizontal and vertical gird references 76 and displays the corrected grid 80 to a maintenance operator.

If at this stage the corrected grid 80 includes an identifier 70, e.g. a blank space, the maintenance operator can use the spatial position of the blank space to ascertain the physical location of the corresponding faulty chain-link sub-module 28.

Once the faulty chain-link sub-module 28 is repaired, the steps outlined above are repeated to create a corrected grid 80 which includes reference to all of the chain-link sub-modules 28.

In other embodiments of the invention, the software may instead correct the perspective distortion of the initial virtual map to create a corrected initial virtual map (not shown), and then create a grid.

Once the corrected grid 80 is created, it is stored on either the software or on the computer 66 to be used as necessary. Alternatively, the corrected grid 80 is stored on an external storage device such as a USB drive.

To identify the physical location of a particular, e.g. faulty, chain-link sub-module 28 within the chain-link converter 24, a maintenance operator may input a command to the computer 66 to switch on a particular LED 54 to present a locating visual signal.

The particular LED 54 could be selected by its corresponding serial number which may have been identified as faulty by another component of the chain-link converter 24.

The camera 62 records the locating visual signal of the LED 54 and transfers the locating visual signal to the computer 66.

The software on the computer 66 firstly creates data corresponding to the locating visual signal and then corrects the perspective distortion of the data.

Next, the software combines the corrected data with the pre-stored corrected grid 80.

This combination results in a locating virtual map 80, as shown in FIG. 5, which includes an indicator 68 showing the spatial position of the chain-link sub-module corresponding to the particular LED 54 that presented the locating visual signal. The locating virtual map 80 is then displayed to a maintenance operator via the computer 66.

A maintenance operator can take note of the grid reference position of the particular LED 54 and use that to discern the exact physical location of the corresponding faulty chain-link sub-module 28 within the chain-link converter 24.

Alternatively, a maintenance operator may instead produce a hard copy, e.g. by printing, of the locating virtual map 80 and use the hard copy to discern the exact physical location while being in close proximity to the chain-link converter 24.

When a maintenance operator operates an LED 54 that does not present a visual signal, there is no visual signal for the camera 62 to record. As a result, no data is created by the computer 66 and therefore nothing is combined with the corrected grid 80.

As such, the resulting visual map displayed to the operator is blank, i.e. it is the corrected grid 80 on its own.

The blank virtual map (not shown) therefore indicates to the maintenance operator that the corresponding chain-link sub-module 28 is faulty.

The maintenance operator subsequently operates each of the other LEDs 54 to create a series of locating visual signals.

Each locating visual signal is recorded by the camera 62 and transferred to the computer 66. The pre-installed software on the computer 66 then creates associated data.

The associated data includes an indicator 68 (to indicate the spatial position of a chain-link sub-module 28 with an LED 54 that is presenting a visual signal) and an identifier 70 (to identify the spatial position of a chain-link sub-module 28 with an LED 54 that is not presenting a visual signal).

The software then corrects the perspective distortion of the data and combines the corrected data with the pre-stored corrected grid 80 to create a checking virtual map 84, as shown in FIG. 6. The checking virtual map 84 includes indicators 68 (that are single points of light) and an identifier 70 (which is a blank space).

The checking virtual map 84 is displayed to a maintenance operator.

In this way, the spatial position of the faulty chain-link sub-module 28 is shown in the checking virtual map and therefore a maintenance operator can identify the physical location of the failed chain-link sub-module 28 within the chain-link converter 24.

Alternatively, when the faulty LED 54 does not present a visual signal, and therefore no visual signal is recorded by the camera 62, the computer 66 may be configured to create associated data which includes an identifier 70.

The software then corrects the perspective distortion of the data and combines the corrected data with the pre-stored corrected grid 80 to create a locating virtual map. The locating virtual map this time includes the identifier 70 which could be a point, a cross or text, for example. The locating virtual map is then displayed to a maintenance operator.

The identifier 70 must be capable of distinguishing itself over an indicator 68 so that an operator is readily able to discern that the corresponding chain-link sub-module 28 is faulty.

Moreover, a maintenance operator may input a command to the computer 66 to switch on all of the LEDs 54, or a group of LEDs 54, on a periodic basis so as to check for any faulty chain-link sub-module 28 within the chain-link converter.

The invention claimed is:

1. An electrical assembly comprising:
a chain-link converter including a plurality of chain-link sub-modules each of which is operable to provide a voltage source, each of the chain-link sub-modules being provided with a visual indicator;
a controller configured to selectively operate each of the visual indicators to present a respective mapping visual signal;
an image receiving device configured to receive the respective mapping visual signal; and
a processor operatively coupled to the image receiving device, the processor being configured to receive and process the respective mapping visual signal received by the image receiving device so as to create a map of a spatial arrangement of the chain-link sub-modules.

2. An electrical assembly according to claim 1 wherein the controller is configured to selectively operate one or more of the visual indicators to present a locating visual signal, the image receiving device is configured to receive the locating visual signal, and the processor is configured to receive and process the locating visual signal received by the image receiving device to indicate a spatial position of the corresponding chain-link sub-module on the map.

3. An electrical assembly according to claim 1 wherein each visual indicator is configured to not present a visual signal when the corresponding chain-link sub-module is in a faulty operating state.

4. An electrical assembly according to claim 1 wherein the processor is configured to create one or more identifiers on the map to identify a spatial position of one or more chain-link sub-modules with a visual indicator that is not presenting a visual signal.

5. An electrical assembly according to claim 1 wherein the or each visual signal received by the image receiving device has perspective distortion, and wherein the processor is further configured to correct the or each perspective distortion.

6. An electrical assembly according to claim 1 wherein the processor is configured to combine data created through processing of each mapping visual signal so as to create the map.

7. An electrical assembly according to claim 1 wherein the map is or includes a grid, a list or a 3-D model.

8. An electrical assembly according to claim 1 wherein the map is a virtual map.

9. An electrical assembly according to claim 1 wherein the processor is operatively coupled to the controller, and the processor is configured to selectively operate each visual indicator to present a visual signal.

10. An electrical assembly according to claim 1 wherein the visual indicator is or includes an LED, a filament lamp or a mechanical indicator.

11. An electrical assembly according to claim 1 wherein the image receiving device is or includes a camera, preferably a camera that is configured to exclude or include at least one wavelength of light that falls between far infrared and ultra violet regions of the electromagnetic spectrum.

12. An electrical assembly according to claim 1 wherein the processor is or includes a computer, a mobile phone, a tablet or a microprocessor based device.

13. A method of identifying the location of a chain-link sub-module within a chain-link converter, the method comprising the steps of:
(a) providing each of the chain-link sub-modules with a visual indicator;
(b) operating each of the visual indicators to present a respective mapping visual signal;
(c) receiving the respective mapping visual signal; and
(d) processing the respective received mapping visual signal to create a map of a spatial arrangement of the chain-link sub-modules.

14. A method according to claim 13 further comprising the steps of:
(e) operating one or more of the visual indicators to present a or a respective locating visual signal;
(f) receiving the respective locating visual signal; and
(g) processing the or the respective locating visual signal to indicate a spatial position of the or each corresponding chain-link sub-modules on the map.

15. A method according to claim 13 further comprising the step of configuring each visual indicator to not present a visual signal when the corresponding chain-link sub-module is in a faulty operating state.

16. A method according to claim 13 comprising the step of creating one or more identifiers on the map to identify a spatial position of one or more chain-link sub-modules with a visual indicator that is not presenting a visual signal.

17. A method according to claim 13 wherein the or each visual signal recorded by the image receiving device has perspective distortion, and wherein the method further comprises the step of correcting the perspective distortion of the or each visual signal.

* * * * *